United States Patent
Pillai

(10) Patent No.: US 7,865,497 B1
(45) Date of Patent: Jan. 4, 2011

(54) SITEMAP GENERATION WHERE LAST MODIFIED TIME IS NOT AVAILABLE TO A NETWORK CRAWLER

(75) Inventor: Anand Pillai, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 378 days.

(21) Appl. No.: 12/035,139

(22) Filed: Feb. 21, 2008

(51) Int. Cl.
*G06F 17/30* (2006.01)
(52) U.S. Cl. ...................................... 707/709
(58) Field of Classification Search ................. 705/709; 707/709
See application file for complete search history.

(56) References Cited

U.S. PATENT DOCUMENTS 6,424,966 B1 * 7/2002 Meyerzon et al. .................. 1/1
7,082,427 B1 * 7/2006 Seibel et al. ....................... 1/1
7,685,192 B1 * 3/2010 Scofield et al. ............. 707/709

OTHER PUBLICATIONS

Brandman et al., Crawler-Friendly Web Servers, 2000.*
Nelson et al., Efficient, Automatic Web Resource Harvesting, 2006.*
Tan et al., Efficiently Detecting Webpage Updates Using Samples, 2007.*
Wikipedia—Wayback Machine—Aug. 19, 2010.*

* cited by examiner

*Primary Examiner*—James Trujillo
*Assistant Examiner*—William Spieler
(74) *Attorney, Agent, or Firm*—Fish & Richardson P.C.

(57) ABSTRACT

Methods, systems and apparatus, including computer program products, for generating a sitemap where a last modified time of website content is not available to a network crawler. A current version number of a content item is compared to the version number of that content at the time sitemap for the website was generated. If the version number has changed the last modified time in a generated sitemap is set to the current time to cause the item to be revisited by a search engine.

43 Claims, 4 Drawing Sheets

```
<url>
<loc>http://www.example.com/image1.jpg</loc>
<changefreq>never</changefreq>
<lastmod>2006-12-25</lastmod>
<contenttype>image/jpeg</contenttype>
<language>EN</language>
<image:image>
<image:landing_page_loc>http://www.example.com/photo1.html</image:landing_page_loc>
<image:caption>caption text</image:caption>
<image:keywords>image keywords</image:keywords>
<image:category>category name</image:category>
<image:size>1600x1200</image:size>
<image:family_friendly>yes</image:family_friendly>
</image:image>
</url>
```

SITEMAP GENERATION WHERE LAST MODIFIED TIME IS NOT AVAILABLE TO A NETWORK CRAWLER

BACKGROUND

This specification relates to indexing items available on a network.

Network search engines create an index of items available on the network. Items can include documents, images, audio files, video files, and generally any format that can be transmitted digitally over a network. To catalog the items on the network, a network crawling application (crawler), also sometimes referred to as a robot, attempts to access as many items as can be found on the network. For example, the crawling application can begin by accessing a first page, indexing that page, in some cases saving a cached version of the page, and then proceeding on to other pages or items linked to by the first page. This can continue, iteratively, until all links have been followed.

For a public network such as the Internet, website publishers often wish to have their website content included in a search engine's index so that potential visitors interested in the content can locate the website. A publisher can register with one or more search engines to request that their website be included in the index. Registering with a search engine identifies the location of a website to the search engine so that the crawling application can access the site and place it in the search engine index.

A crawling application, however, might not find all content that is available at a given website, or may not extract content from that site that includes all of the detail that the website's publisher would like to include. For example, some website content might not be easily reached by a crawling application because that content is stored in a database application instead of being stored in a file that is linked to by a URL. In other cases, the content can be found by the crawling application, but details such as a title of a video or a caption of an image might not be extracted and associated with the item as desired by the publisher.

To assist a search engine in better indexing a website, a publisher can create a sitemap representing the website. A sitemap can include links to documents and/or other items that the publisher would like to have included in the search engine index. The sitemap can provide details regarding the network items that might not be extracted by a crawling application on its own. A number of established Internet search engine providers have agreed on standard sitemap formats so that publishers can create a single sitemap that is useful to multiple search engines.

SUMMARY

In general, one aspect of the subject matter described in this specification can be embodied in methods that include the actions of reading a current version number of a website content item, comparing the current version number to a stored version number, and setting a last modified time of a sitemap entry for the website content item to a time later than a time at which a most recent previous sitemap was generated if the current version number differs from the stored version number.

In particular implementations, the method includes updating the stored version number to the current version number for later use in generating another sitemap. The stored version number can be updated to the current version number by replacing a list of stored version numbers or modifying a list of stored version numbers. Reading a current version number of a website content item can include connecting to a database of website content items to retrieve the current version number of the website content item. The database of website content items can comprise a database of photographs of a photograph sharing website. The photograph sharing website can include an image manipulation tool configured to update a current version number of an image file manipulated using the tool.

In particular implementations, the time later than the time at which a most recent previous sitemap was generated includes the current day based on a current system time or a current system time. The method can further include providing the sitemap entry to a search engine for use in indexing the website content item.

Other embodiments include corresponding systems, apparatus, and computer program products.

Particular embodiments of the subject matter described in this specification can be implemented to realize one or more of the following advantages. Without an actual last modified time being available, a last modified time of a sitemap entry for a given content item is set to a value to cause a search engine to re-index and/or re-cache the item if that item's version number has changed since the last sitemap generation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows an example sitemap entry for a photo content item of a photo hosting website.

Like reference numbers and designations in the various drawings indicate like elements.

DETAILED DESCRIPTION

Figure 1:
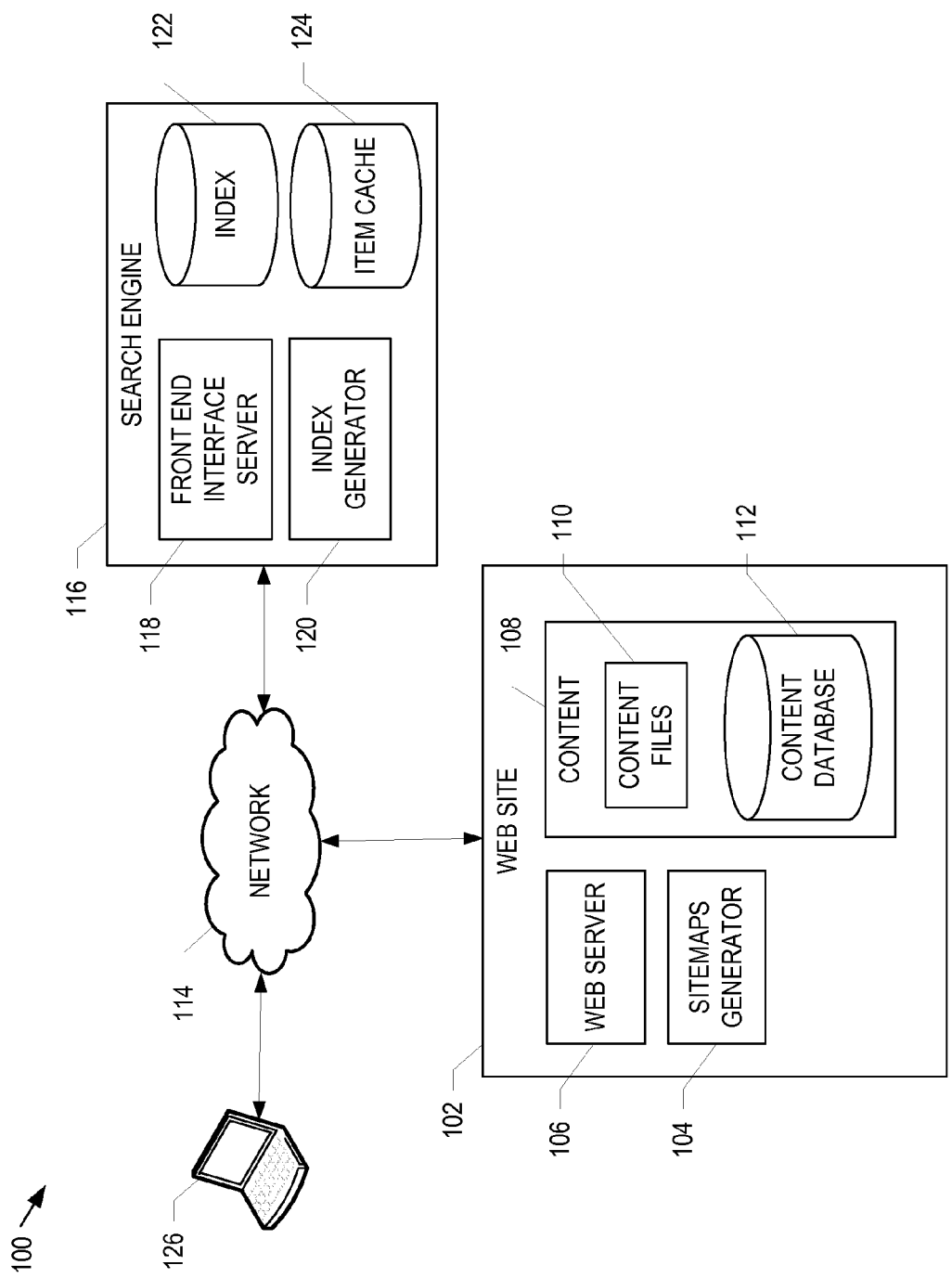
FIG. 1 is a block diagram of an example environment of a sitemaps generator.

FIG. 1 is a block diagram of an example environment 100 of a sitemaps generator 104. The sitemaps generator 104 can be a computer program running on server hardware that includes the website content 108. In some implementations, the sitemaps generator can be a computer program running on a separate server having network access to server hardware including the website content 108. The web server 106 serves the content 108 to the computer 126 over the network 114. For example, the web server 106 can send the content 108 to an Internet browser application running on the computer 126.

The content 108 can include content files 110 and/or content stored in the content database 112. The content files 110 can include items that are accessible using the file system of a server on which the files are stored, and the content in the content database 112 can include items that are accessible using connections to a database application. The web server can access the content in the content database 112 though connections to the database for retrieving the content from the content database 112 and serving the retrieved content over the Internet.

A user of the computer 126 can access the search engine 116 to perform searches of the search engine index 122. The front end interface server 118 can send HTML code to the computer 126 that is interpreted by an Internet browser application of the computer 126 to display a search engine user interface on a display of the computer 126, with the computer 126 functioning as a user interface device. The search engine 116 includes an index generator 120 for creating the index 122 and the item cache 124. The item cache 124 can be a repository of items that have been indexed by the index generator. For example, following the reading of a page from the content files 110 being read by a crawling application of the index generator 120, a copy of the page in the form as it was read can be saved in the item cache 124.

To assist the index generator 120 in creating an index of the website 102, the publisher of the website can provide a sitemap of the website 102 to the search engine 116. The sitemaps generator 104 can be configured to read the content files 110 and/or the content database 112 to create one or more sitemap files in a format accepted by the search engine 116. The format of the sitemap can include a last modified time for respective content items. When the last modified time of a given content item is later than the time that the content item was last indexed and/or stored in the item cache 124, the search engine 116 can direct the index generator 120 to revisit the content item (e.g., content 108) to update the index 122 and/or the item cache 124. In some cases, the last modified time of a content item is not available. For example, a last modified time might not be available for content stored in the content database 112. Where a last modified time information is not available for a content item, the sitemaps generator 104 can manipulate a last modified time for the item in a generated sitemap based on other available information. For example, the sitemap generator 104 can base a last modified time of a given content item stored in the content database 112 on a version number for the content item included in the content database 112. Content items can include text files, audio files, image files, and/or video files.

Figure 2:
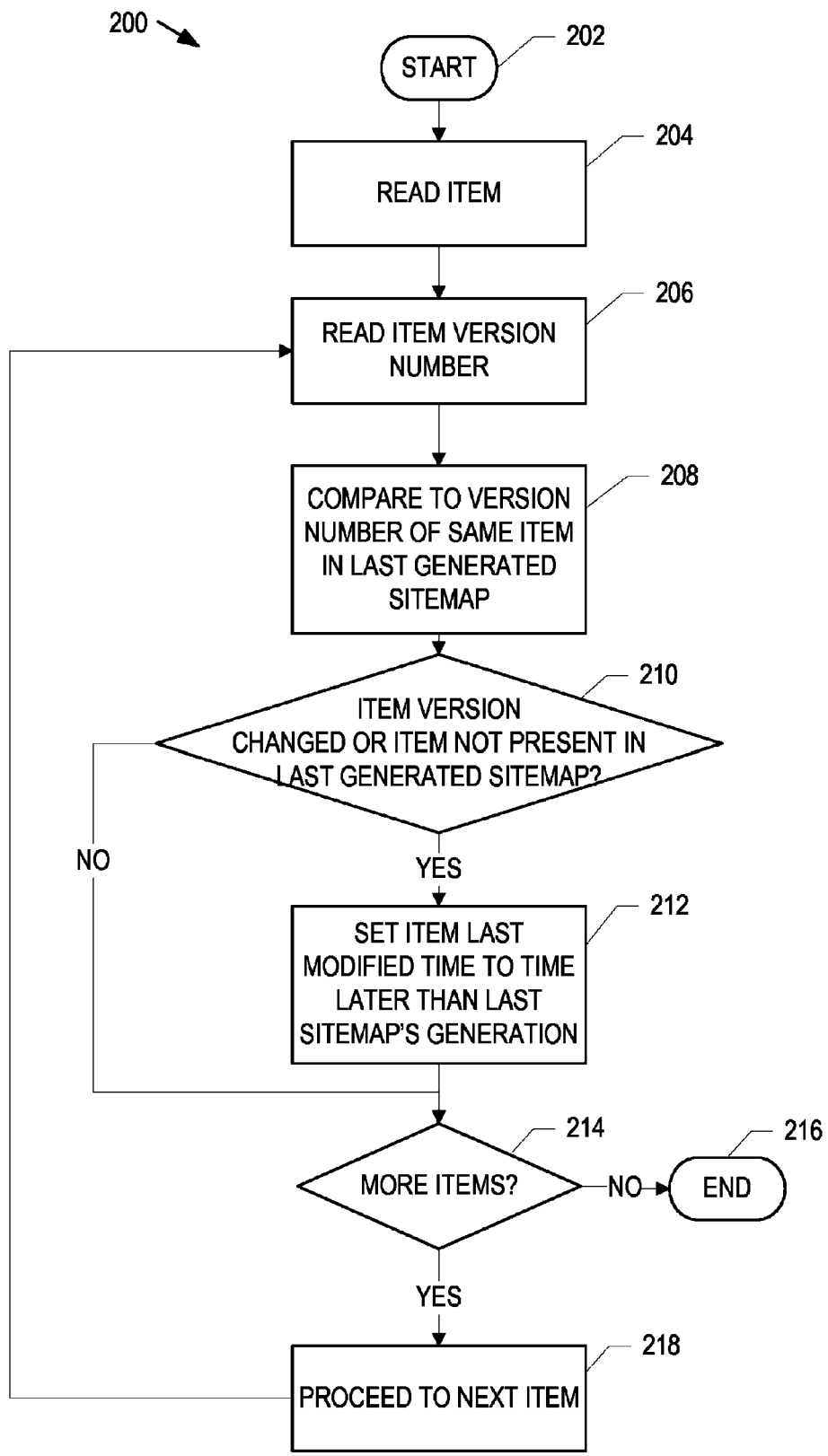
FIG. 2 is a flowchart of an example method for changing the last modified date of a sitemap entry based on a version number.

FIG. 2 is a flowchart of an example method 200 for changing the last modified date of a sitemap entry based on a version number. The method starts (202), and a content item having version numbering is read (204). The version numbering can be a version number that is updated following modification of the item. The item's version number is read (206). The current version number is compared to the same item's version number at the time of the last sitemap generation (208). For example, a stored list of item version numbers sorted by some key, e.g., a unique item identifier, can include item version numbers in the state that existed at the time of the last sitemap generation. The version numbers of the stored list can be compared to current version numbers. If the version number of the item has changed since the last sitemap generation (210), the last modified time of the item's corresponding entry in the new sitemap being generated is set to a time later than that of the last sitemap generation (212). For example, the last modified time can be set to the current system time or to the current day based on the current system time. If the item version number has not changed, the last modified time is not altered. If there are no more items (214) the process ends (216). If there are more items (214), the process proceeds to read the next content item (216), and the process continues to read the version number of that item (206).

By updating the last modified time of the content item to the current system time based on item version numbering, the resulting sitemap will indicate to the search engine that the search engine's index 122 and/or item cache 124 is no longer current and needs to be updated. As a result the search engine can direct the index generator 120 to return to the location of the item to re-read the item to update the index 122 and/or the document cache 124.

Figure 3:
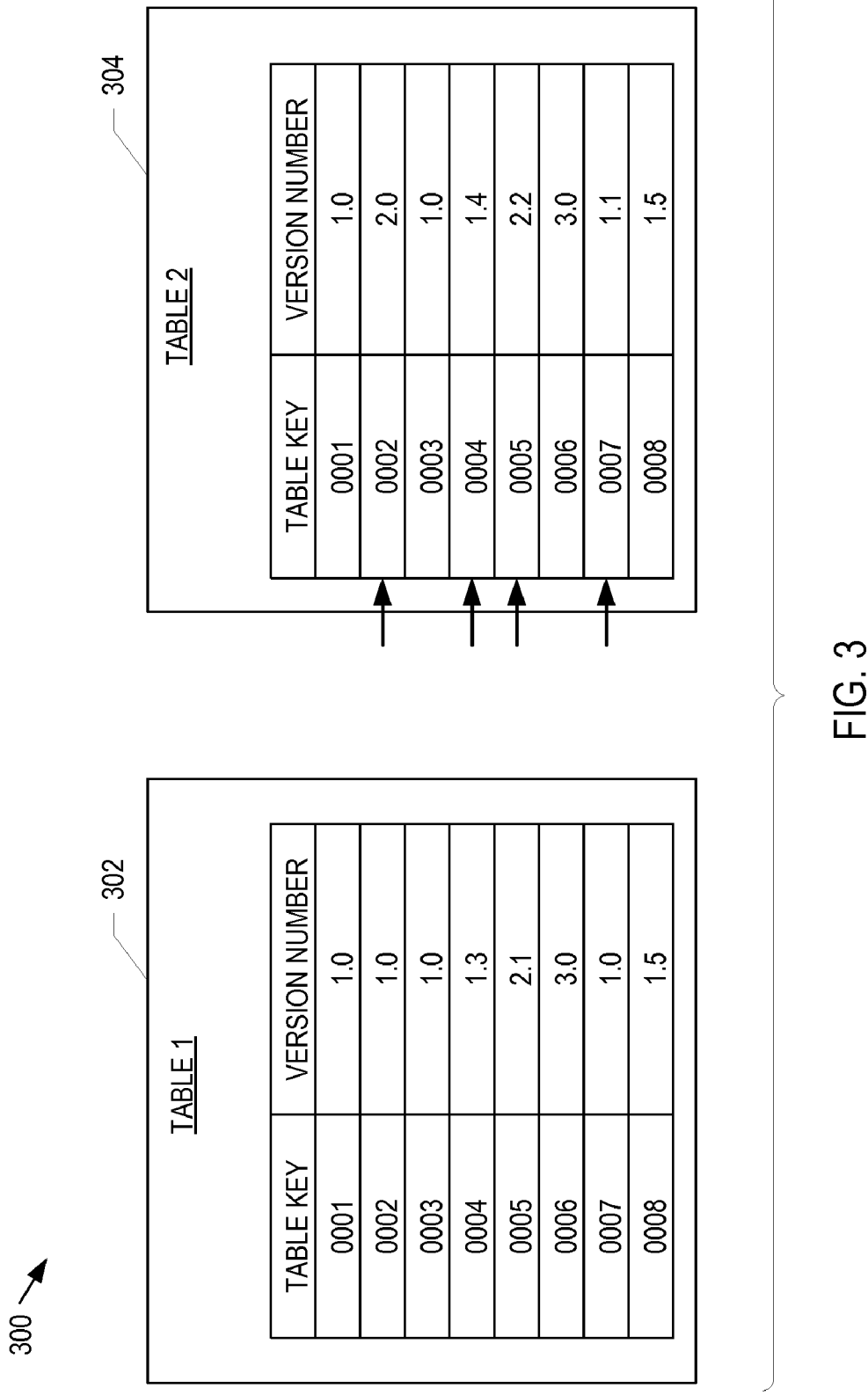
FIG. 3 shows two tables including item version numbers.

FIG. 3 shows two tables 300 including item version numbers. The first table 302 can include item version numbers in a state that existed at the time the last sitemap for the website was generated such that the first list is a historical list. The second table 304 represents the item version numbers in a state that exists at the time of generation of a new sitemap such that the second list is a current list. The two tables are sorted based on the same key field. The key can be, for example, a URL or an item identifier that remains static for a given content item between a period including the generation of a first sitemap and the generation of a second subsequent sitemap.

The rows marked with arrows indicate items that have changed version numbers. The last modified times of the sitemap entry for these items can be set to an a time that is later than the time at which a last sitemap was generated, to cause the search engine 116 to revisit these items for updating the search engine index 122 and/or the item cache 124. For example, the last modified time can be set to a current system time of a server on which the sitemap generator is running.

In some implementations, the sitemaps generator 104 creates the table 302 during a previous sitemap generation. The table 302 can then be read during the next sitemap generation for comparison with the current item version numbers. The second table 304 can be created during the next sitemap generation, and the two tables can be compared. Following this comparison, the first table 302 can be discarded and the second table 304 can be used in a subsequent sitemap generation. Alternatively, the second table 304 is not generated, and the item version numbers are instead read by the sitemaps generator 104 and compared to the first table 302 as the sitemap is generated. Where an item with a changed document number is identified, the last modified time of that item can be set to the current system time, and the first table 302 can be updated with the new version number.

In some implementations, the process 200 is used to generate sitemaps for an Internet photo hosting site. The photos of the hosting site can be uploaded by users and stored in a database. The photo hosting site can include one or more image manipulation tools that permit a user to, for example, resize, crop, and rotate uploaded photos. The last modified time of the photos is not available for a sitemaps generator 104 to use in creating a sitemap. Changes to a photo, however, cause a version number field in the photo database to be updated. The sitemaps generator 104 can perform the process 200 in generating a sitemap for the photo hosting site. The resulting sitemap can be provided to the search engine 116 for indexing the photo hosting site.

The search engine 116 can index the photos and permit search engine users to search the images using the search engine 116. For example, a sitemap for the photo hosting site can include photo title, subject, location, and/or or caption information that can be indexed to permit a search engine user to locate photos that have information that matches a keyword search. The sitemaps generator 104 sets the last modified time of a given photo to the current system time for photos that have a version number that has changed since the generation of the last sitemap for the photo hosting site. A change in the version number of a given photo indicates that the photo has been modified in the photo hosting website database. The search engine 116, upon receiving the sitemap with an entry for the photo having a last modified time that is newer than the version of the photo that was last indexed and/or saved in the item cache 124, revisits the photo to update the index 122 and/or item cache 124. The photo information in the index 122 and the photo saved in the item cache 124 is kept current with the version of the photo that is available at the photo hosting site.

FIG. 4 shows an example sitemap entry 400 for a photo content item of a photo hosting website. The sitemap entry 400 includes a number of information tags that enclose corresponding information between the open tag and the close tag. The sitemap entry 400 includes a location tag <loc></loc> that indicates where the photo can be found on the network. The last modified time of the photo content item is included between the <lastmod> and </lastmod> tags. It is this information that is updated to the current system time (the current system time of a server where the sitemaps generator 104 is running, for example) by the sitemaps generator 104 during the process 200. For example, the last modified time included between the <lastmod> and </lastmod> tags of sitemap entries for items in the second table 304 of FIG. 3 having updated version numbers (rows with table keys 0002, 0004, 0005, and 0007) can be set to the current system time.

The sitemap entry 400 also includes keyword, caption, and category information that can be indexed by a search engine 116 to permit search engine users to search for photos located on the photo hosting site. A sitemap having one or more entries of the format shown in FIG. 4 can be generated. The sitemap can be stored in a location on the website agreed upon by the web site administrator and the search engine so that the search engine can retrieve the sitemap for processing. Alternatively, the sitemap can be uploaded or otherwise transmitted from the web site to the search engine.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
a user interface device;
a database configured to store a plurality of files in association with respective version numbers;
a web server configured to:
serve files from the database to the user interface device;
a sitemap generator configured to:
determine that a file has a previously stored version number:
compare a current version number associated with the file to the previously stored version number of the file; and
generate a sitemap having an entry corresponding to the file wherein a last modified time value of the entry is based on the comparison of the current version number to the previously stored version number wherein an actual last modified time of the file is not available.

2. The system of claim 1, wherein:
the last modified time value of the entry is set to a current time if the current version number is changed from the previously stored version number.

3. The system of claim 1, wherein:
the last modified time value of the entry is set to a later time than a time any previous sitemap having an entry for the file was generated if the current version number is changed from the previously stored version number.

4. The system of claim 1, wherein:
the web server is further configured to:
receive files uploaded from the user interface device; and
store uploaded files in the database.

5. The system of claim 1, wherein:
the web server is further configured to:
store the current version number associated with the file for later use by the sitemap generator.

6. The system of claim 1, wherein:
the web server is further configured to:
provide a user interface of an image manipulation module to the user interface device,
the system further comprising an image manipulation module configured to:
permit remote users to modify an image file stored in the database; and
update the version number of a user modified image file.

7. The system of claim 1, wherein the files comprise files of a type selected from text files, audio files, image files, and video files.

8. A method, comprising:
reading a current version number of a website content item;
determining that the website content item has a previously stored version number;
comparing the current version number to the previously stored version number; and
setting a last modified time of a sitemap entry for the website content item to a time later than a time at which a most recent previous sitemap was generated if the current version number differs from the stored version number wherein an actual last modified time of the website content item is not available.

9. The method of claim 8, further comprising:
storing the current version number associated with the file for later use by the sitemap generator.

10. The method of claim 8, wherein:
reading a current version number of a website content item comprises retrieving the current version number of the website content item from a database of website content items.

11. The method of claim 10, wherein:
the database of website content items comprises a database of image files of a photograph sharing website.

12. The method of claim 11, wherein:
the photograph sharing website includes an image manipulation tool configured to update a current version number of an image file manipulated using the tool.

13. The method of claim 8, wherein:
the time later than the time at which a most recent previous sitemap was generated comprises the current day based on a current system time.

14. The method of claim 8, wherein:
the time later than the time at which a most recent previous sitemap was generated comprises is a current system time.

15. The method of claim 8, further comprising:
providing the sitemap entry to a search engine for use in indexing the website content item.

16. The method of claim 8, wherein:
the stored version number comprises a version number stored at a time at which a most recent previous sitemap was generated.

17. A method, comprising:
generating a current list of version numbers of website content items read from a database;
comparing the current list to a historical list of version numbers; and
setting a last modified time of sitemap entries corresponding to content items having version numbers in the current list that differ from version numbers in the historical list to a time later than the time at which a most recent previous sitemap was generated wherein an actual last modified time of the website content item is not available.

18. The method of claim 17, further comprising:
replacing the historical list with the current list.

19. The method of claim 17, further comprising:
updating the historical list based on the current list.

20. The method of claim 17, wherein:
the current list and the historical list are sorted by a common key.

21. The method of claim 17, wherein:
comparing the current list to a historical list of version numbers comprises comparing a version number in the current list to a version number in the historical list that has a matching key value.

22. The method of claim 17, wherein:
the version numbers of the historical list comprise version numbers of the content items at a time at which a most recent previous sitemap was generated.

23. The method of claim 17, wherein:
the database comprises a database of image files of a photograph sharing website.

24. The method of claim 23, wherein:
the photograph sharing website includes an image manipulation tool configured to update a version number of an image file manipulated using the tool.

25. The method of claim 17, wherein:
the time later than the time at which a most recent previous sitemap was generated is a current system time.

26. A computer program product, encoded on a computer-readable storage medium, operable to cause data processing apparatus to perform operations comprising:
reading a current version number of a website content item;
determining that the website content item has a previously stored version number;
comparing the current version number to the previously stored version number; and
setting a last modified time of a sitemap entry for the website content item to a time later than a time at which a most recent previous sitemap was generated if the current version number differs from the previously stored version number wherein an actual last modified time of the website content item is not available.

27. The computer program product of claim 26, the instructions further including:
storing the current version number associated with the file.

28. The computer program product of claim 26, wherein:
reading a current version number of a website content item comprises retrieving the current version number of the website content item from a database of website content items.

29. The computer program product of claim 28, wherein:
the database of website content items comprises a database of image files of a photograph sharing website.

30. The computer program product of claim 29, wherein:
the photograph sharing website includes an image manipulation tool configured to update a current version number of an image file manipulated using the tool.

31. The computer program product of claim 26 wherein:
the time later than the time at which a most recent previous sitemap was generated comprises a current day based on a current system time.

32. The computer program product of claim 26 wherein:
the time later than the time at which a most recent previous sitemap was generated is a current system time.

33. The computer program product of claim 26, the instructions further including:
providing the sitemap entry to a search engine for use in indexing the website content item.

34. The computer program product of claim 26, wherein:
the stored version number comprises a version number stored at a time at which a most recent previous sitemap was generated.

35. A computer program product, encoded on a computer-readable storage medium, operable to cause data processing apparatus to perform operations comprising:
generating a current list of version numbers of website content items read from a database;
comparing the current list to a historical list of version numbers; and
setting a last modified time of sitemap entries corresponding to content items having version numbers in the current list that differ from version numbers in the historical list to a time later than the time at which a most recent previous sitemap was generated wherein an actual last modified time of the website content item is not available.

36. The computer program product of claim 35, the instructions further including:
replacing the historical list with the current list.

37. The computer program product of claim 35, the instructions further including:
updating the historical list based on the current list.

38. The computer program product of claim 35, wherein:
the current list and the historical list are sorted by a common key.

39. The computer program product of claim 35, wherein:
comparing the current list to a historical list of version numbers comprises comparing a version number in the current list to a version number in the historical list that has a matching key value.

40. The computer program product of claim 35, wherein:
the version numbers of the historical list comprise version numbers of the content items at a time at which a most recent previous sitemap was generated.

41. The computer program product of claim 35, wherein:
the database comprises a database of image files of a photograph sharing website.

42. The computer program product of claim 41, wherein:
the photograph sharing website includes an image manipulation tool configured to update a version number of an image file manipulated using the tool.

43. The computer program product of claim 35, wherein:
the time later than the time at which a most recent previous sitemap was generated is the current system time.

* * * * *

UNITED STATES PATENT AND TRADEMARK OFFICE
CERTIFICATE OF CORRECTION

| | | |
|---|---|---|
| PATENT NO. | : 7,865,497 B1 | |
| APPLICATION NO. | : 12/035139 | |
| DATED | : January 4, 2011 | |
| INVENTOR(S) | : Anand Pillai | |

It is certified that error appears in the above-identified patent and that said Letters Patent is hereby corrected as shown below:

Column 8, Line 42 at Claim 14; replace:
"sitemap was generated comprises is a current system" with
-- sitemap was generated is a current system --

Signed and Sealed this
Eighth Day of March, 2011

David J. Kappos
*Director of the United States Patent and Trademark Office*